US005258778A

United States Patent [19]

Creutzmann et al.

[11] Patent Number: 5,258,778

[45] Date of Patent: Nov. 2, 1993

[54] CHARACTER GENERATOR FOR A NON-MECHANICAL PRINTER

[75] Inventors: Edmund Creutzmann; Manfred Maier; Hand Jurgen Hacke, all of Munich, Fed. Rep. of Germany

[73] Assignee: Siemens Aktiengesellschaft, Munich, Fed. Rep. of Germany

[21] Appl. No.: 548,929

[22] PCT Filed: Jul. 26, 1988

[86] PCT No.: PCT/DE88/00465

§ 371 Date: Jul. 25, 1990

§ 102(e) Date: Jul. 25, 1990

[87] PCT Pub. No.: WO89/08896

PCT Pub. Date: Sep. 21, 1989

[30] Foreign Application Priority Data

Mar. 15, 1988 [DE] Fed. Rep. of Germany ....... 3808636

[51] Int. Cl.[5] ....... G01D 15/14

[52] U.S. Cl. ....... 346/107 R

[58] Field of Search ....... 346/160, 107 R, 76 PH, 346/150; 357/17; 312/341.1; 307/147; 361/407

[56] References Cited

U.S. PATENT DOCUMENTS 4,506,272 3/1985 Arai ....... 346/76 PH
4,536,778 8/1985 DeSchamphelaere et al. ..... 346/160
4,553,148 11/1985 Behrens et al. ....... 346/107 R
4,566,170 1/1986 Dolan ....... 357/17 X
4,571,602 2/1986 De Schamphelaere et al. ... 346/160
4,608,621 8/1986 Porter ....... 361/428
4,628,411 12/1986 Balders et al. ....... 361/407 X
4,732,436 3/1988 Nelson ....... 312/341.1
4,780,731 10/1988 Creutzmann et al. ....... 346/108
4,821,051 4/1989 Hediger ....... 346/160 X
4,905,123 2/1990 Windle et al. ....... 361/407 X
4,912,484 3/1990 Yamagishi et al. ....... 346/76 PH X

FOREIGN PATENT DOCUMENTS 3031295 3/1981 Fed. Rep. of Germany .
3223031 12/1983 Fed. Rep. of Germany .
2099221 12/1982 United Kingdom ....... 346/107 R

OTHER PUBLICATIONS

"Led Array Print Head Configuration", by P. F. Heidrich et al., IBM Technical Disclosure Bulletin, vol. 25, No. 7A, Dec. 1982, pp. 3368-3370.

*Primary Examiner*—Benjamin R. Fuller
*Assistant Examiner*—David Yockey
*Attorney, Agent, or Firm*—Hill, Steadman & Simpson

[57] ABSTRACT

A character generator for use in a non-mechanical printer is embodied in an electrophotographic printer. A character generator (1) having a plurality of light sources (113) is provided in a non-mechanical printer. The light sources (113) are secured to the character generator (1) in the form of chips (112). Given outage of a light source (113) it is not possible without further ado to replace individual chips (112) and the complete character generator (1) must be replaced.

Inventively, the character generator (1) is modularly constructed, i.e. individual modules (11) each having a respective plurality of light sources (113) are detachably secured to a module carrier (13), so that individual modules (11) can be very easily replaced given the outage of individual light sources (113) or of other electronic component parts.

14 Claims, 5 Drawing Sheets

CHARACTER GENERATOR FOR A NON-MECHANICAL PRINTER

BACKGROUND OF THE INVENTION

The invention is directed to a character generator for a non-mechanical printer and, in particular, for an electrophotographic printer.

WO-87/02162 already discloses a character generator for a non-mechanical printer. This character generator contains a plurality of light sources in an exposure line, these light sources, for example, being fashioned as light-emitting diodes. A latent, electrostatic image is generated on a transfer printing drum upon employment of the light sources. In such a character generator, all of the component parts forming the exposure line such as the light-emitting diodes, drive circuits and leads, can be firmly mounted on a common carrier, for-example can be glued. The carrier has a length that is at least as great as the width of the entire exposure line.

In such a character generator, it is not possible to replace a single defective component part, for example a single light-emitting diode, or an individual, integrated circuit without further ado. A character generator usually contains more than 100 component parts, so that all of the component parts that are still good must also be thrown away given the outage of one component part.

DE-C2-30 31 295 discloses an opto-electronic recording means wherein latent electrostatic images of a numerical characters to be printed are generated on a light-sensitive surface, for example of a photoconductive drum, via a light waveguide arrangement with the assistance of light-emitting diodes that are arranged in groups in mutually offset rows on screwed-down ceramic plates of a carrier element. The light waveguide arrangement is composed of a plurality of gradient fibers that are embedded such in a matrix material that a transmission of the image information arises due to the lens effect of the gradient fibers.

DE-A1-32 23 031 discloses a printer having an optical printer head for line-byline recording of graphics and text information, whereby light emission arrangements abutting one another via seating surfaces and having a plurality of light emission elements are arranged together with control elements on a carrier plate of ceramic and light points corresponding to the information to be recorded are imaged on a light-sensitive surface via an imaging optics. The light emission elements of the light emission arrangements that are preferably arranged in one row or graduated in two rows comprise light-emitting surfaces that are fashioned parallelogram-like in order to generate a faultless, quenchable latent electrostatic image on the light-sensitive surface. A cooling member that is connected to the carrier plate in thermally conductive fashion is also provided for eliminating the thermal energy of components arranged on the carrier plate. In a character generator fashioned in this way, it is likewise not possible without further ado to separately replace individually, malfunctioning light emission elements on the light emission arrangements without discarding the overall carrier plate.

US-A-4 4,536,778 discloses a modularly constructed character generator of an electrophotographic printer means with which information are recorded line-by-line on a light-sensitive surface, for example of a photoconductive drum. A plurality of light-emitting modules are secured on a metal rail for this recording process. A respective, electrically and thermally conductive base plate on which a plurality of light-emitting chip elements is secured in an exposure line is typical of the individual modules. The length of every base plate is thereby preferably less than the length of the chip elements situated on the base plate. In order to form a uniform exposure line, the individual base plates having the light-emitting chip elements projecting beyond the limitation of the base plate are glued onto the metal rail in tight proximity. The projection of the chip elements beyond the base plate limitation has the disadvantage that the thin chip elements are damaged given improper handling of the modules. Over and above this, it is disadvantageous that the closely adjacent base plates may potentially expand to such an extent due to thermal stresses that appear given a high dissipated thermal power of the character generator or, respectively, of the light-emitting modules that the thin, light-emitting chip elements that project beyond the base plate limitation can break.

SUMMARY OF THE INVENTION

It is therefore the object of the invention to specify a character generator for a non-mechanical printer wherein the discarding given outage of a component part becomes minimal.

In a character generator of the species initially cited, this object is inventively achieved by a character generator having: exposure modules with a plurality of light sources detachably arranged on a module carrier; every exposure module connected to the module carrier in thermally conductive fashion; every exposure module having a carrier plate with at least one joining surface via which the exposure modules lie against one another gap-free; and the light sources integrated on chips that are arranged set back with respect to the joining surface of the carrier plate.

Due to the module construction of the character generator, the overall length of the exposure line is subdivided into a plurality of parts, preferably of equal length. The division of the component parts forming the exposure line ensues in accord with the sub-lengths that have been formed. The unit of a sub-length represents a module. The module contains all component parts that are required for the operation of the light sources. In addition to the light sources, these are, in particular, the drive circuits as well as the leads for the electronic signals and the power supply.

Due to the module structure, different printing widths can be realized in a simple way. Moreover, the advantage derives that a module can be easily replaced by a new module after the mechanical and electrical connections have been released when one or more component parts of the module have failed during operation of the character generator. The remaining modules continue to remain employable. The possibility of repair is thereby established, this offering considerable advantages compared to previous character generators. The module structure also makes it possible to economically manufacture character generators having an extremely wide printing width.

The individual modules are constructed following one another on a module carrier, so that a continuous exposure line arises whose overall length preferably amounts to a whole multiple of the module length. What is thereby critical is that no additional gap that would disturb the homogeneity or, respectively, the equidistance in the exposure line arises at the joint between two neighboring modules. The distance between two light sources defines the maximally possible gap width and is prescribed by the demand of the printing grid.

The character generator of the invention is suitable for extremely high printer output and, since a plurality of light sources are present, a high dissipated heat arises that must be eliminated. This is achieved in that the modules comprise a metal plate having extremely good thermal conductivity, the component parts being attached thereto. Copper is preferably employed as material. An extremely good thermal contact is assured on the basis of a suitable joining technique. The module carrier is preferably composed of the same material as the plates of the modules in order to avoid thermal stresses that could deteriorate the high-precision structure. The seating surfaces of the modules and of the module carrier are fashioned such that an extremely good thermal conductivity is present. This is achieved by super high-precision in the surface processing.

Toward the neighboring modules, the modules comprise joining surfaces that assure the homogeneity or, respectively, the equidistance in the exposure line. These joining surfaces need not extend over the entire lateral surface of the modules. It is adequate when they are situated in the region of the exposure line. The joining surfaces can be arranged perpendicular to the longitudinal direction of the exposure line; however, it is expedient to arrange the joining surfaces inclined relative to the longitudinal direction of the exposure line, particularly when the light sources are arranged respectively offset relative to one another in two rows that proceed parallel to one another. The light sources are preferably monolithically constructed as chips and the lateral surfaces of these chips are then expediently arranged parallel to the joining surface.

The arrangement of the light sources in two parallel rows is especially expedient because the light sources have a larger diameter than the grid spacing, i.e. the spacing of the light sources in longitudinal direction of the exposure line. Due to an optimally simple editing of the printing data, the distance between the rows must be optimally small. On the other hand, the distance between a light source and the joining surface that can also be referred to as module intersection edge must be optimally large so that the light sources are not damaged when joined to one another. The joining surface inclined relative to the longitudinal direction of the exposure line derives as a result thereof. The joining gap, i.e. the distance between two neighboring chips, can thus become of such a size that the mechanical tolerances of the joining surfaces fabricated with super high-precision do not have a disadvantageous influence on homogeneity of the overall line.

Due to the digital drive, the plurality of light sources on a chip is preferably dyadic, i.e. 32, 64, 128, etc.

The individual modules forming an exposure line are mounted such on the module carrier that an extremely high positional precision is established and such that the connection can be undone in turn at any time. The power supply is supplied in parallel to every module and is connected such to the module that a separation of the connection is possible at any time. Data and control lines are supplied to the first module and are further-connected to the respectively next module of the character generator with suitable connections that can be released at any time. A cooling arrangement that eliminates the dissipated heat to an external cooling system is provided at the module carrier.

BRIEF DESCRIPTION OF THE DRAWINGS

Further advantages and improvements of the invention derive from the following description of the exemplary embodiment with reference to the drawings. Thereby shown are.

DESCRIPTION OF THE PREFERRED EMBODIMENT

Figure 1:
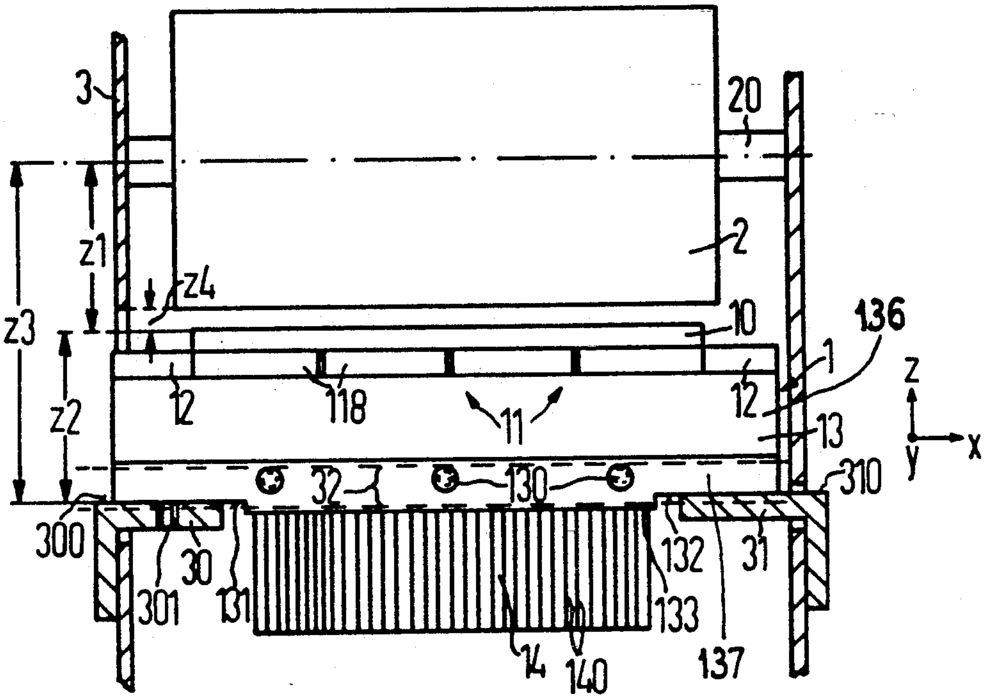
FIG. 1 a fundamental sub-structure of an electrophotographic printer for generating a latent, electrostatic image, shown in cross section.

FIG. 1 shows how a character generator 1 and a transfer printing drum 2 are integrated in a printer housing 3 of a printer. The transfer printing drum 2 is axially fixed for this purpose on a spindle 20 that is rotatably seated in the printer housing 3. The character generator 1 is secured in the printer housing 3 at a variable distance z3 below the rotatably seated transfer printing drum 2. To that end, the character generator 1 has its two ends firmly mounted on adjustable fastening elements 30, 31. The fastening elements 30, 31 that are angular in cross section are integrated such in the printer housing 3 that the position of the fastening planes 300 or, respectively, 310 of the fastening elements 30, 31—with reference to the rotational axis of the transfer printing drum 2—can be adjusted to the distance z3 with a gauge. The distance z3 that is thus set is thereby composed of two different distances z1, z2. It is indispensable for a faultless operation of the printer that a prescribed overall tolerance that must also be observed for the established distance z3 is not exceeded due to manufacturing and assembly tolerances for the two distances z1, z2 that occur.

The overall tolerance is essentially defined by an imaging optics 10 of the character generator 1. Thus, the depth of field of the imaging optics 10 dare not be changed due to the addressed tolerances for the sake of a good imaging quality. This can be explained based on the fact that the imaging optics 10 reproduces picture elements of light sources, for example light-emitting diodes (LEDs), on the transfer printing drum 2. These light sources are respectively arranged on an exposure module 11 that is positively locked to a web 136 of a module carrier 13 fashioned T-shaped. Detent elements 12 that prevent a dislocation of the exposure modules 11 in x-direction during the operating condition of the character generator 1 are also provided on the web 136 of the module carrier 13. The flange 137 of the module carrier 13 fashioned T-shaped also comprises running rollers 130 that are secured in respective pairs diametrically opposite one another at the two long end-face sides of the flange 137. Over and above this, the base area of the flange 137 is divided into two seating surfaces 131, 132 as well as into a step surface 133 offset from these two seating surfaces 131, 132 and on which a plurality of cooling elements 140 forming a cooling arrangement 14 are secured, for example soldered.

Since a plurality of light sources are present, a high dissipated heat arises that must be eliminated. This is achieved in that the modules 11 comprise a metal plate 118 having extremely good thermal conductivity on which the component parts are attached. Copper is preferably employed as material. An extremely good thermal contact is assured on the basis of a suitable joining technique. The module carrier 13 is preferably composed of the same metal as the plates of the modules 11 in order to avoid thermal stresses that could deteriorate the high-precision structure. The seating surfaces of the modules 11 and of the module carrier 13 are fashioned such that an extremely good thermal conductivity is present. This is achieved by utmost precision in the surface working. For the operation of the printer, the character generator is inserted to such an extent into the printer housing 3 in that the running rollers 130 are movable in x-direction in guide rails 32 of the printer housing 3 until the character generator 1 has its seating surfaces 131, 132 lying on the fastening elements 30, 31 in the fastening planes 300, 310. the character generator 1 integrated in such fashion forms a structural unit together with the transfer printing drum with respect to the distances z1 through z3 entered in FIG. 1, this structural unit in turn changing only given constantly changing, different fabrication and assembly tolerances. With respect to a tangential distance z4 between the transfer printing drum 2 and the imaging optics 10, for example, fabrication tolerances thus derive that are based on a variable spindle eccentricity of the transfer printing drum 2. When, for example, the overall tolerance of the distance z3 to be required amounts to 0.1 mm and when, as a consequence of the spindle eccentricity, a tolerance of what is likewise 0.1 mm is taken into consideration for the distance z4 given a high-precision manufacture of the transfer printing drum at the same time, then the character generator 1 must be manufactured with a precision of at least 0.01 mm in order to guarantee a faultless imaging of the picture elements of the light sources onto the transfer printing drum 2. Extremely high demands made of the structural design of the character generator 1 in the direction of the z-coordinate derive therefrom, this to be discussed below in the description of FIGS. 2 through 9.

Figure 2:
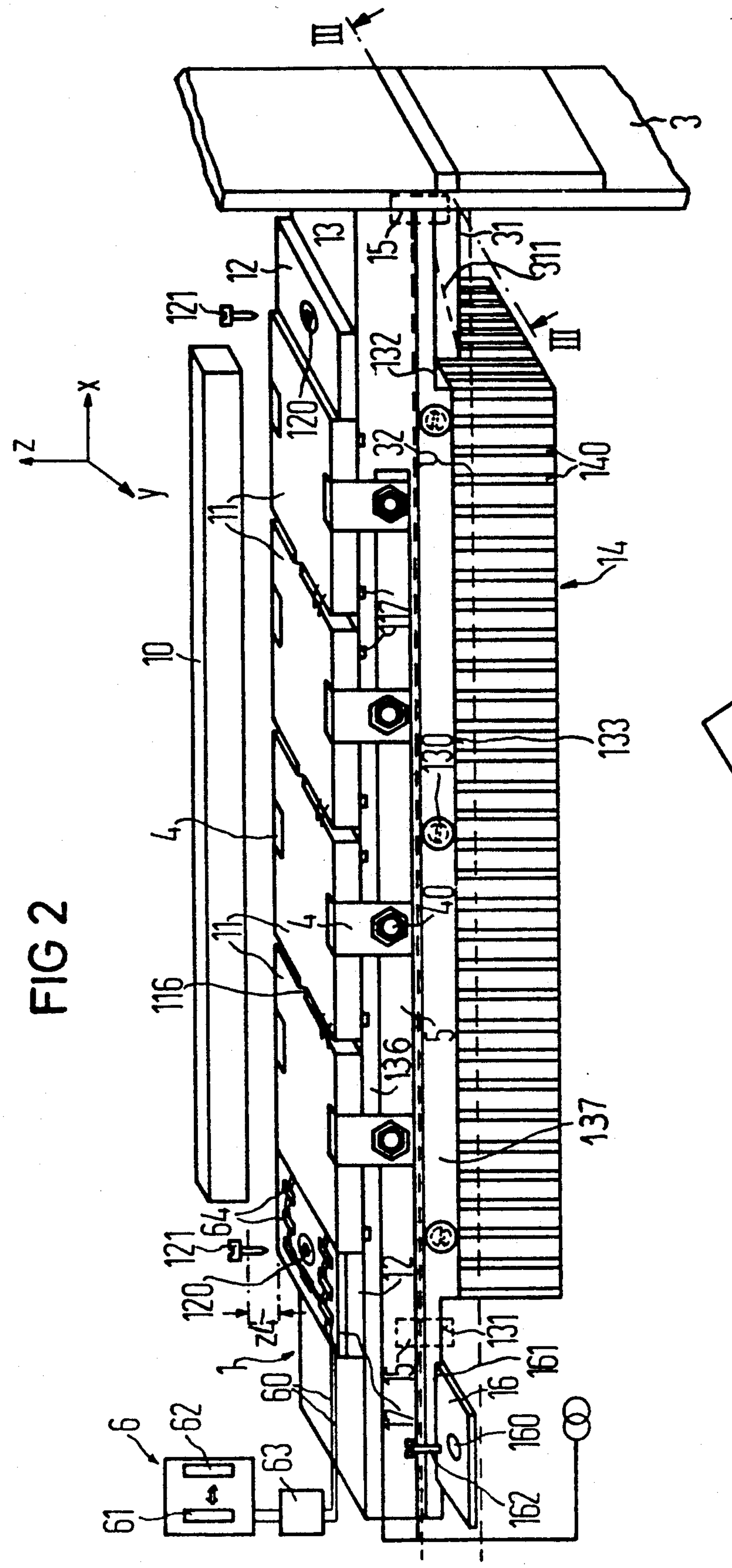
FIG. 2 a perspective, axonometric illustration of the structure of a character generator that generates latent, electrostatic images.
Figure 3:
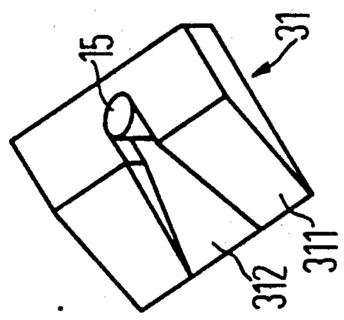
FIG. 3 a perspective illustration of a fastening element for fixing the character generator.

To that end, FIG. 2 shows a perspective, axonometric illustration of the fundamental structure of the character generator 1. The four exposure modules 11 indicated in FIG. 1 are arranged positively and non-positively locked in longitudinal direction on the web 136 of the module carrier 13. For this purpose, both contacting surfaces of both the module carrier 13 as well as of the exposure modules 11 are mechanically worked to an extremely high precision in a special manufacturing process in order to obtain an air gap smaller than 2 μm between the two contacting surfaces in the assembled condition. The exposure modules 11 arranged in this fashion respectively abut one another at joining surfaces 116 that are fabricated with super high-precision. The extremely small air gap is especially required for the sake of a good heat transmission between the contacting surfaces. The same is also true in this context for the air gap between the joining surfaces 116 of two exposure modules 11 that contact one another, this air gap being likewise smaller than 2 μm. The reasons for this shall be set forth in greater detail in the description of FIGS. 4, 5. So that the abutting of the respective modules 11 is also preserved during the operating condition, the position of the exposure modules 11 on the module carrier 13 is fixed for all three coordinate directions. The detent elements 12 have already been pointed out in the description of FIG. 1 for the x-direction. A through opening 120 is respectively let into these detent elements 12 in order to secure the detent elements 12 at a prescribed location on the web 136 of the module carrier 13 with, for example, the assistance of fastening screws 121. The spacing of the through openings 120 in the assembled condition of the detent elements 12 is dimensioned such that the modules 11 lying between the detent elements 12 are clamped positively locked in x-direction. Over and above this, a printed circuit board 15 also lies on the one detent element 12, this printed circuit board 15 being likewise fixed with the fastening screw 121. The interlocking fixing of the modules 11 in y-direction and in z-direction shall be set forth in greater detail in the description of FIGS. 6, 7, 8.

FIG. 2 also shows that the imaging optics 10 is arranged at a distance z4' above the module surface and that the exposure modules 11 comprise a flexible, electrical ribbon line 4 at their respective end faces that are still freely accessible, the exposure modules 11 being supplied with current for the light-emitting diodes and drive electronics via this ribbon line 4. To this end, every flexible ribbon line 4 is connected via a screwed connection 40 to a planar electrical lead lane 5 that extends in x-direction past all exposure modules 11 arranged on the module carrier 13, extending on both long sides of the module carrier web 136. The necessity of such a lead lane 5 fashioned large-area may be explained based on the fact that currents of 80 through 100 A are not unusually due to the great number of light-emitting diodes integrated on the modules 11 of the character generator 1. The drive of the light-emitting diodes is undertaken via data and control lines 60 by a microprocessor-controlled means 6 that, among other things, contains a central processor 61 and a memory 62 for this purpose. An analog-to-digital converter 63 as well as a plurality of amplifying driver modules 64 that are arranged on the printed circuit board 17 follow this microprocessor-controlled means 6. The signals are forwarded amplified to the light-emitting diodes from the driver modules 64 on the data and control lines.

Under the seating surface 131, the character generator 1 also comprises a fixing element 16 fashioned plate-shaped and, under the seating surfaces 131, 132, the character generator 1 comprises a guide pin 15 respectively projecting from the module carrier 13. When, for integration into the printer housing 3, the character generator 1 now has its guide rollers 130 inserted along the guide rail 32, then the guide pin 15 projecting centrally under the seating surfaces 131, 132 is respectively brought along a ramp 311 of the fastening elements 30, 31 up to the detent (shown in FIG. 3) of a guide slot 312 that tapers toward detent. The taper of the guide slot 312 is dimensioned such that the guide pin 15 is fixed without play in y-direction. The positional fixing of the character generator 1 in x-direction is effected by the plate-shaped fixing element 16. To that end, the fixing element 16 is secured such in a recess 161 of the seating surface 131 with which it forms a flush surface that parts of the fixing element 16 that are of the respectively same size project out at both long sides of the character generator 1. A further through opening 160 is respectively let into the middle in this projecting part. When the character generator 1 has its seating surface 132 lying on the fastening element 31 in the contacting plane 310 and when the character generator 1 likewise has its seating surface 131 lying on the fastening element 30 in the contacting plane 300, then it is fixed in x-direction with two further fastening screws 162 that are let into a corresponding threaded bore 301 according to the illustration in FIG. 1. The character generator 1 or, respectively, the module carrier 13 is thus clearly fixed in all three coordinate directions relative to the transfer printing drum 2 shown in FIG. 1.

Figure 4:
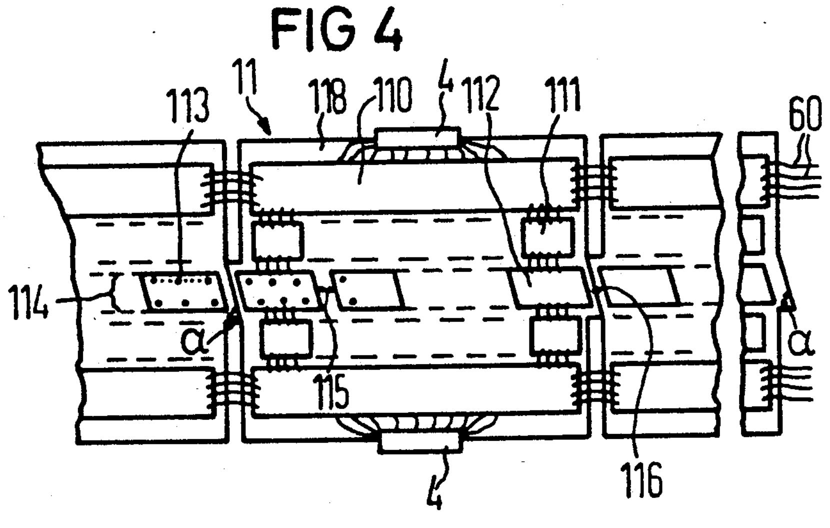
FIG. 4 the plan view onto an exposure module of the character generator required for generating latent, electrostatic images.
Figure 5:
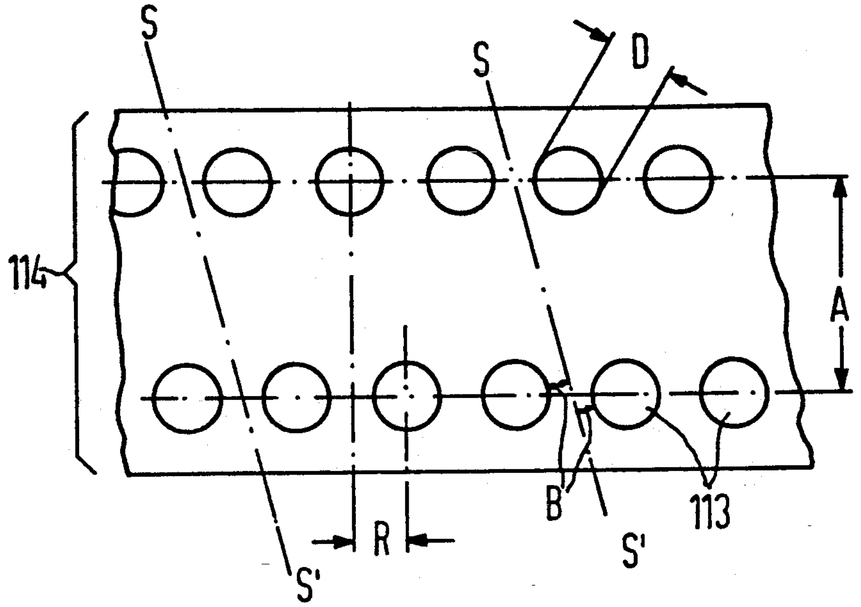
FIG. 5 the arrangement of the light-emitting diodes (LEDS) combined to form an exposure line of the character generator.

In order to be able to generate latent, electrostatic images on the transfer printing drum 2 with the character generator 1 positioned in such fashion in the sequel and in order to be ultimately able to thereby print arbitrary characters on a recording medium, the light-emitting light sources 113 as chips 112 having paired, parallel sides and containing 64 or 128 LEDs dependent on the printing grid are monolithically integrated in a regular spacing in an exposure line 114 on the metal plates 118 of the exposure modules 11, as shown in FIG. 4. Dots are entered in FIG. 4 as representing these LEDS. Over and above this, the LEDs are shown enlarged in FIG. 5 as concentric circles having the diameter D. According to FIG. 5, the individual LEDs are arranged in the exposure line 114 or, respectively, on the chips 112 in two rows proceeding at an equidistant interval A and at the spacing A by [sic] an offset R. This offset is defined dependent on the printing grid. Typically employed printing grids are, for example, 240 dpi (dots per inch), 300 dpi and 600 dpi. The offset of the LEDs 113 is required, among other things, because the diameter D of the LEDs 113 is larger for the said printing grid than the offset R resulting therefrom and the LEDs 113 can therefore not be arranged in a single-row, continuous exposure line 114. Moreover, the numbers 64 or, respectively, 128 is not arbitrarily selected for the plurality of LEDs 113 per chip 112 on the metal plates 118 of the character generator 1; rather this is based on conditions that are interrelated to the digital drive of the LEDs 113. For this digital drive, an integrated circuit 114 is provided on the metal plate 118 for each LED row of the chip 112, as may be seen in FIG. 4. Each of these integrated circuits 111 is connected via a bus system 110 both to the flexible ribbon line 4 as well as via the driver modules 64 on the printed circuit board 17 to the data and control lines 60 and, thus, is connected to the power supply or, respectively, to the microprocessor-controlled means 6. All printing data from the light-emitting diodes 113 in the exposure line 114 are stored and edited in this means 6. The plurality of these printing data is thereby essentially dependent on the spacing A between the two LED rows. The printing data can be all the more simply edited in the microprocessor-controlled means 6 the smaller this distance A is. This demand made of the spacing A due to the electronics, however, can no longer be observed when the exposure line 114 established in FIG. 5 is to be subdivided into individual chips 112 according to the illustration in FIG. 4 and a distance B between a parting line S . . . S′ and the LEDs 113 adjacent thereto should thereby be optimally large so that these are not damaged. In this case, the largest possible spacing B would be established exactly when the spacing A between the two LED rows were infinite. The solution of this optimization problem is established by the equation $$A=4\,R \tag{1}$$

This is equivalent thereto that the exposure line 114 is parted at an angle of $\alpha=76°$ in the middle between two neighboring LEDs 113 on the LED row. A different plurality of chips 112 on the metal plate 118 of the individual module derives dependent on which printing grid is selected for the character generator 1. It must thereby be assured in every case that a whole multiple of the individual chips 112 is arranged on the metal plate 118 of the module 11 in x-direction. On the other hand, the plurality of exposure modules 11 is optimized for various formats of recording media as shown in the following table.

| Printing Grid | LED's per Chip | Chips per exposure module | Plurality of modules for an overall line having the width DIN A4 across | DIN A3 across |
|---|---|---|---|---|
| 240 dpi | 64 | 9 | 5 | 8 |
| 300 dpi | 64 | 14 | 4 | 6 |
| 600 dpi | 128 | 14 | 4 | 6 |

In accord with the module division, the blank from which the individual exposure modules 11 are fabricated is parted with particular care at the angle $\alpha$ in the region of the exposure line 114 and is subsequently also mechanically processed with utmost tolerance precision. This is required so that the joining surfaces 116 that have arisen due to the mechanical processing do not have a disadvantageous influence on the homogeneity of the overall exposure line 114 across all exposure modules 11 of the character generator 1 when the modules 11 are clamped in x-direction. That these joining surfaces 116 do not have a disadvantageous influence on the homogeneity, on the other hand, is only established on the basis of an adequately large joining gap 115 between the individual chips 112 on every module 11. The size of the joining gap 115, however, is in turn highly dependent on the size of the spacing B between the parting line S . . . S′ and the neighboring LEDs 113.

Figure 6:
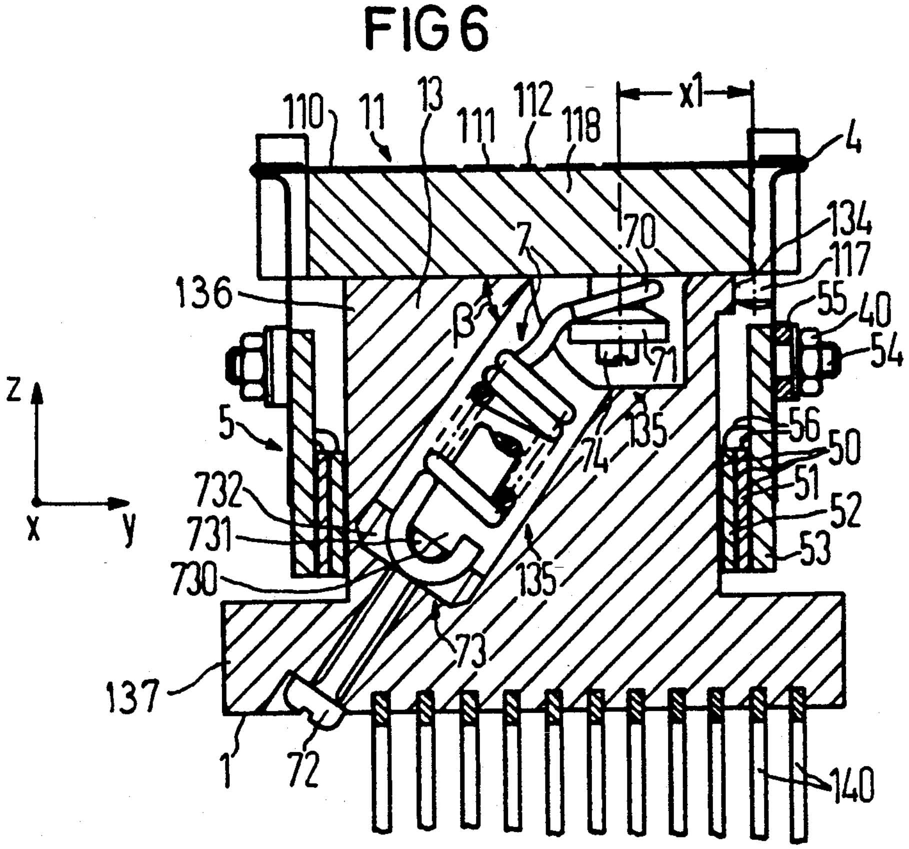
FIG. 6 a cross section through the character generator comprising a first embodiment for fastening the exposure modules.

FIG. 6 shows a cross section through the character generator 1 in order to thus illustrate the fixing of the individual nodules 11 on the web 136 of the module carrier 13 that is fashioned T-shaped. The prerequisite for a first fastening means functioning in this fashion, as shown in FIG. 6, are contacting surfaces of the module carrier 13 and of the individual modules 11 that are mechanically worked with utmost precision. The same is also true in this context for a seating surface 134 of the module carrier 13. A seating pin 117 presses against this seating surface 134 with form-fit in the assembled condition of the exposure module 11. According to illustration in FIG. 2, two such seating pins 114 are provided for every exposure module 11. To that end, the seating pins 117 are let into the respective exposure modules 11 with firm seat. Over and above this, each of these exposure modules 11 comprises a threaded bore on the contacting surface between the two seating pins 117 at a distance xl from them, a screw 74 having a first preform 71 that surrounds the screw shank and broadens in radial direction toward the screw head being let into this threaded bore. A coil spring 70 loadable for tensile stress is hooked in around this preform. A second preform 73 is inserted into this coil spring 70. To this end, this second preform 73 comprises a cylindrical shank 730 having an inside thread and an outside thread. The outside thread is thereby fashioned in axial direction to only such an extent in order to be able to secure a hexagonal nut 732 on the cylindrical shank, this hexagonal 732 having a segment-like nose 731 that is fashioned by mechanical working. The introduction of this preform 73 into the spring 70 ensues such that the other spring end surrounds the nose 731. This spring 70 is guided in a bore 135 that, for example at an angle $\beta$ of 55° relative to the contacting surface of the module carrier 13, penetrates the web 136 of the module carrier 13 proceeding from this contacting surface initially up to the web-to-flange transition. At this location, the bore 135 is reduced in size to a maximum of the diameter of a movement screw 72 down to the base area of the module carrier flange 137. At the respective end of the bore 135, this is liberally bored open corresponding to the outer dimension of the screw head of the movement screw 72 or, respectively, to the dimension of the screw 74 and of the first preform 71. In the assembled condition of the module 11 when this has its contacting surface pressing against the web 136 of the module carrier 13, the module 11 is firmly clamped to the web 136 of the module carrier 13 due to the spring power acting in z-direction and y-direction when the movement screw 72 is turned and, on the other hand, the seating pin 117 of the exposure module 11 is pressed against the seating surface 134 of the module carrier 13.

FIG. 6 also shows how the planar electrical lead lane 5 is constructed in combination with the flexible ribbon line 4. In accord therewith, the lead lane 5 at both long sides of the module carrier web 136 is respectively composed of three electrically non-conductive insulating rails 50, of two power supply rails 51, 52 that respectively deviate from one another in terms of potential relative to the grounded potential of the module carrier 13, and of a respective two-pole contact rail 53, whereby the contact rail 53 is respectively connected to the power supply rails 51, 52 via two power leads 56. Over and above this, the contact rail 53 comprises a perpendicularly outwardly projecting threaded male member 54 onto which the flexible ribbon line 4, a disc 55 are successively pushed and with which the screwed connection 40 produces the contact between the contact rail 53 and the flexible ribbon 4. The planar electrical lead lane 5 is fastened in that the electrically non-conductive insulating rails 50 and the power supply rails 51, 52 are first glued to the respective long side of the module carrier web in alternating succession and the contact rail 53 is then subsequently glued to the respective long side of the module carrier web 136.

Figure 7:
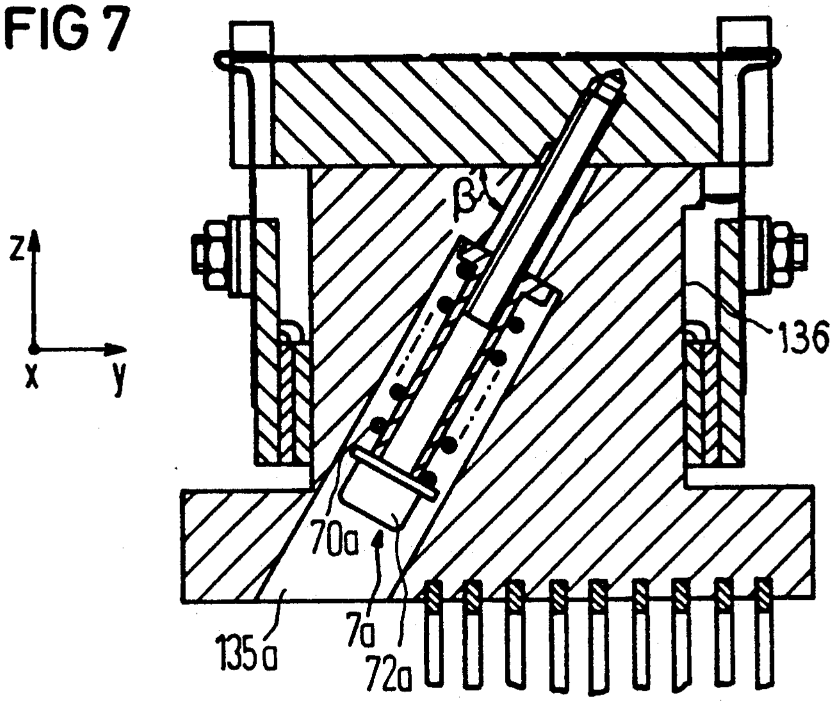
FIG. 7 a cross section through the character generator comprising a second embodiment for fastening the exposure modules.

Alternatively to the embodiment for the module fastening just set forth, FIG. 7 shows the possibility of directly screwing the exposure modules 11 with a cap screw *17a* of a second fastening means *7a* and to thereby employ a compression spring *70a* for the force that opposes the screwing. A bore 135*a* at the angle to the contacting surface of the module carrier web 136 is let into this module carrier web 136 for guiding the second fastening means *7a*. For fixing the exposure modules 11, the second fastening means *7a* is introduced into the bore 135*a* proceeding from the base area of the flange 137.

Figure 8:
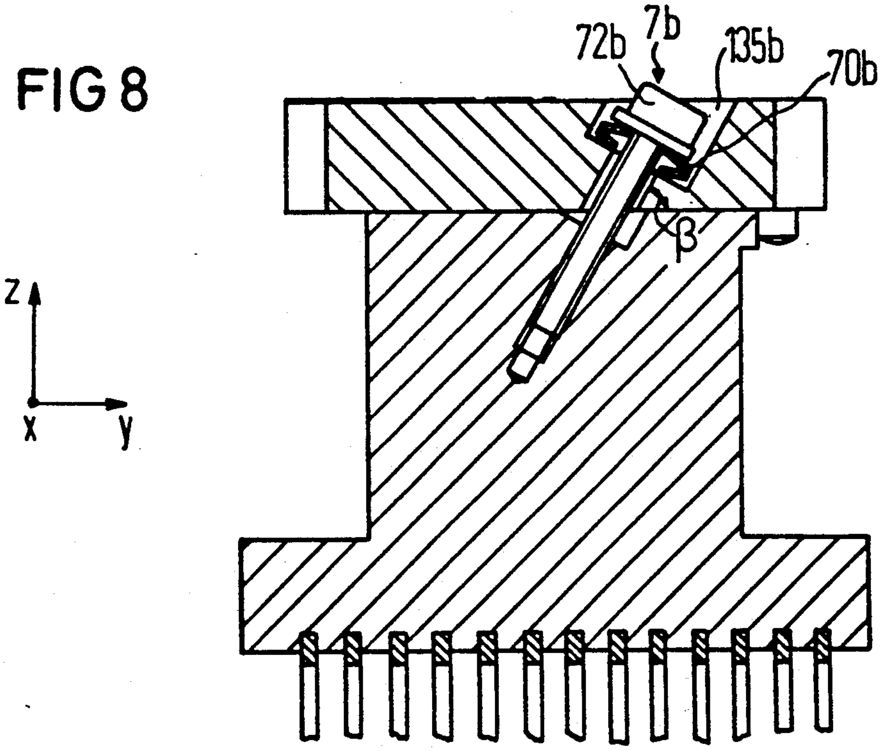
FIG. 8 a cross section through the character generator comprising a third embodiment for fastening the exposure modules.

FIG. 8 shows a further alternative for fixing the modules 11 on the module carrier web. Differing from the two embodiments set forth before, a third fastening means *7b* is let into a further bore 135*b* proceeding from the module side, this further bore 135*b* being inclined at the angle $\beta$ relative to the contacting surface of the exposure module 11. The spring power opposing the clamping of a further cap screw 72*b* is generated by a Belleville spring washer 70*b* that reacts to compressive stresses. This embodiment of the module fixing, however, can only be employed for exposure modules 11 wherein the integration density of the chips 112 is less by nearly half. This type of module fastening, for example, is thus possible in character generators 1 having a printing grid of 240 dpi.

Figure 9:
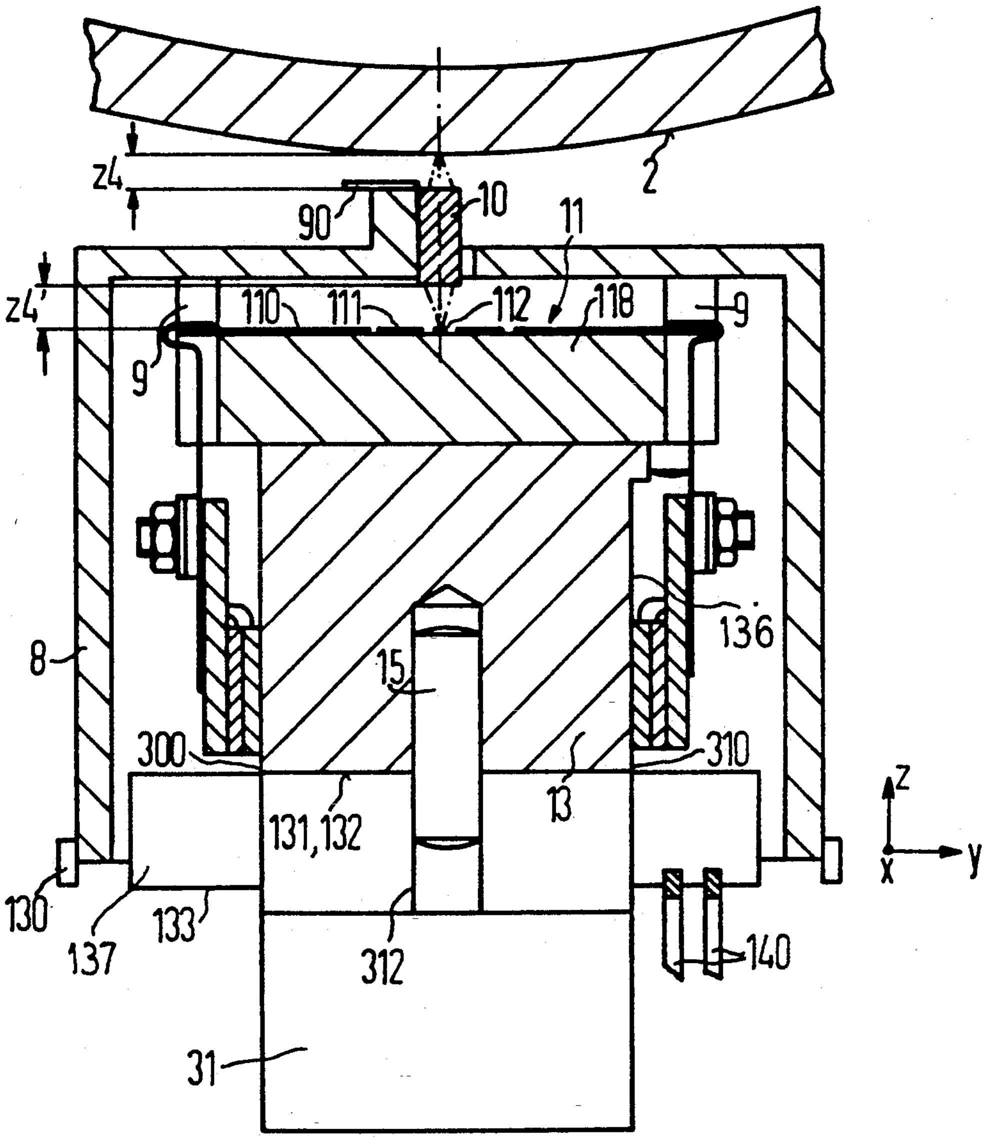
FIG. 9 a section through the character generator.

In a section through the character generator 1, FIG. 9 shows how this is fixed in y-direction in the printer housing 3. To that end, it is particularly shown how the guide pin 15 is let into the web 137 of the module carrier 13. It is also shown how the imaging optics 10 is arranged in z-direction and in y-direction relative to the transfer printing drum 2 and relative to the light sources 113 on the chip 112 of the exposure modules 11. With respect to its imaging geometry, the imaging optics 10 is of such a nature that the light points generated in the exposure line 114 of the exposure module 11 are respectively projected onto the transfer printing drum 2 in an imaging scale of 1:1. In order to achieve an extremely good imaging quality of the light points, the indicated distances z4, z4′ must be identical. To that end, the imaging optics 10 is integrated in a covering 8 and is centrally positioned together with this covering 8 over the exposure line 114 or, respectively, the chips 112. The covering 8 is in turn fixed relative to the exposure modules 11 by spacers 9. Over and above this, the covering 8 is fashioned such that the character generator 1 is protected against external contamination up to the running rollers 130, this contamination particularly occurring when the latent, electrostatic images are developed on the transfer printing drum 2. The imaging optics 10 in turn that extends over the entire exposure line 114 of the character generator 1 according to FIG. 2 and thereby projects every light point of the light-emitting diodes 113 onto the transfer printing drum 2 in the said imaging scale is protected against contamination by a closure mechanism 90 that does not cover the imaging optics 10 during the imaging process. To that end, the closure mechanism 90 is seated displaceable in y-direction on the covering 8.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

The following is a list of reference numerals corresponding to the elements of the present invention as depicted in the figures.

| List of Reference Characters | |
|---|---|
| 1 | character generator |

-continued

| List of Reference Characters | |
|---|---|
| 2 | transfer printing drum |
| 3 | printer housing |
| 4 | ribbon line |
| 5 | lead lane |
| 6 | microprocessor-controlled means |
| 7,7a,7b | fastening means |
| 8 | covering |
| 9 | spacer |
| 10 | imaging optics |
| 11 | exposure module |
| 12 | detent element |
| 13 | module carrier |
| 14 | cooling arrangement |
| 15 | guide pin |
| 16 | fixing element |
| 17 | printed circuit board |
| 20 | spindle |
| 30, 31 | fastening element |
| 32 | guide rail |
| 40 | screwed connection |
| 50 | insulating rail |
| 51, 52 | power supply rail |
| 53 | contact rail |
| 54 | threaded male member |
| 55 | disc |
| 56 | power lead |
| 60 | data and control line |
| 61 | central processor |
| 62 | memory |
| 63 | analog-to-digital converter |
| 64 | driver module |
| 70 | coil spring (tension spring) |
| 70a | compression spring |
| 70b | Belleville spring washer |
| 71 | first preform |
| 72 | movement screw |
| 72a,72b | cap screws |
| 73 | second preform |
| 74 | screw |
| 90 | closure mechanism |
| 110 | bus system |
| 114 | exposure line |
| 115 | joining gap |
| 116 | joining surface |
| 117 | seating pin |
| 118 | metal plate, carrier plate |
| 120,160 | through opening |
| 121 | fastening screw |
| 130 | guide roller |
| 131,132 | seating surface |
| 133 | offsetstep surface |
| 134 | seating surface |
| 135,135a,13-5b | bore |
| 136 | web of module carrier |
| 137 | flange of module carrier |
| 140 | cooling elements |
| 161 | recess |
| 162 | fastening screw |
| 300,310 | fastening plane |
| 301 | threaded bore |
| 311 | ramp |
| 312 | guide slot |
| 730 | cylindrical shank |
| 731 | nose |
| 732 | hexagonal nut |
| A | distance between the two LED rows on the chip |
| B | greatest possible distance between the parting line S. . .S' and the neighboring light source |
| D | diameter of the LEDs |
| R | offset between two light sources |
| x1 | distance between the seating pins and a threaded bore on the contacting surface of the exposure module |
| z1 | distance between the rotational axis of the spindle and the imaging optics |
| z2 | distance between the imaging optics and the fastening planes |
| z3 | distance between the rotational axis of the spindle and the fastening planes |
| z4 | tangential distance between the transfer printing drum and the imaging optics |
| z4' | distance between the imaging optics and the module surface |
| α | angle of inclination of the joining surfaces |
| β | angle of inclination of the bores |

We claim:

1. A character generator for a non-mechanical printer, particularly an electrophotographic printer, comprising:

a) a plurality of exposure modules, each exposure module of the plurality of exposure modules having a plurality of light sources and being detachably arranged on a module carrier;

b) each exposure module of the plurality of exposure modules connected to the module carrier in a thermally conductive fashion;

c) each exposure module of the plurality of exposure modules having a carrier plate having at least one joining surface that lies gap-free against a joining surface of a carrier plate of an adjacent exposure module; and the plurality of light sources of each exposure module of the plurality of exposure modules integrated on chips that are arranged set back with respect to the joining surface of the carrier plate of each exposure module of the plurality of exposure modules.

2. The character generator according to claim 1, wherein seating surfaces of the exposure modules and of the module carrier are thermally conductive.

3. The character generator according to claim 1, wherein the carrier plates of the plurality of exposure modules are composed of a material that is the same as a material of which the module carrier is composed.

4. The character generator according to claim 1, wherein the light sources of the plurality of exposure modules form an exposure line and wherein for each joining surface the light sources of the plurality of exposure modules neighboring the joining surface in the exposure line of a respective exposure module are arranged at a distance from the joining surface of the respective exposure module.

5. The character generator according to claim 4, wherein the joining surface of the respective exposure module is inclined relative to a longitudinal direction of the exposure line.

6. The character generator according to claim 4, wherein the light sources that form the exposure line are arranged in two rows that proceed in parallel, are equidistantly arranged within a respective row, light sources of one row of the two rows being offset with respect to light sources of the other row of the two rows; and wherein joining surfaces of two adjacent exposure modules separate two neighboring light sources of each row of the exposure line.

7. The character generator according to claim 4, wherein a parting line of the chips is arranged parallel to the joining surface of the respective exposure module; and wherein a multiple of chips is arranged on the respective exposure module.

8. The character generator according to claim 7, wherein the light sources integrated on chips are dyadically arranged to provide a printing grid of a latent, electrostatic image.

9. The character generator according to claim 1, wherein the exposure modules are detachably electrically connected to one another by parallel lines.

10. The character generator according to claim 1, wherein the character generator further comprises a cooling arrangement that emits dissipated heat from the module carrier to an external cooling system, the cooling arrangement being attached to the module carrier.

11. A character generator for a non-mechanical printer, particularly an electrophotographic printer, comprising:

a plurality of exposure modules, each exposure module of the plurality of exposure modules having a plurality of light sources and being detachably arranged on a module carrier;

each exposure module of the plurality of exposure modules connected to the module carrier in a thermally conductive fashion;

each exposure module of the plurality of exposure modules having a carrier plate having at least one joining surface that lies gap-free against a joining surface of a carrier plate of an adjacent exposure module; and the plurality of light sources of each exposure module of the plurality of exposure modules integrated on chips that are arranged set back with respect to the joining surface of the carrier plate of each exposure module of the plurality of exposure modules, the light sources of the plurality of exposure modules forming an exposure line and for each joining surface the light sources of the plurality of exposure modules neighboring the joining surface in the exposure line of a respective exposure module being arranged at a distance from the joining surface of the respective exposure module, the joining surface of the respective exposure module being present only in a region of the exposure line.

12. A character generator for a non-mechanical printer, particularly an electrophotographic printer, comprising:

a plurality of exposure modules, each exposure module of the plurality of exposure modules having a plurality of light sources and being detachably arranged on a module carrier in a thermally conductive fashion;

each exposure module of the plurality of exposure modules having a carrier plate having at least one joining surface that lies gap-free against a joining surface of a carrier plate of an adjacent exposure module;

the plurality of light sources of each exposure module of the plurality of exposure modules arranged set back with respect to the joining surface of the carrier plate of each exposure module of the plurality of exposure modules;

parallel lines detachably electrically connecting the exposure modules to one another; and one of the parallel lines being a planar power supplying line, secured to lateral surfaces of a module carrier web on the module carrier and connected by a screwed connection to another line of the parallel lines, the another line being connected to a respective exposure module.

13. A character generator for a non-mechanical printer, particularly an electrophotographic printer, comprising:

a plurality of exposure modules, each exposure module of the plurality of exposure modules having a plurality of light sources and being detachably arranged on a module carrier;

each exposure module of the plurality of exposure modules connected to the module carrier in a thermally conductive fashion;

each exposure module of the plurality of exposure modules having a carrier plate having at least one joining surface that lies gap-free against a joining surface of a carrier plate of an adjacent exposure module; and the plurality of light sources of each exposure module of the plurality of exposure modules integrated on chips that are arranged set back with respect to the joining surface of the carrier plate of each exposure module of the plurality of exposure modules, the module carrier being T-shaped and running rollers arranged diametrically opposite one another being secured to two end-face sides of a flange of the module carrier.

14. A character generator for a non-mechanical printer, particularly an electrophotographic printer comprising:

a) a plurality of exposure modules, each exposure module of the plurality of exposure modules having a plurality of light sources and being detachably arranged on a module carrier;

b) each exposure module of the plurality of exposure modules connected to the module carrier in a thermally conductive fashion;

c) each exposure module of the plurality of exposure modules having a carrier plate having at least one joining surface that lies gap-free against a joining surface of a carrier plate of an adjacent exposure module; and the plurality of light sources of each exposure module of the plurality of exposure modules integrated on chips that are arranged set back with respect to the joining surface of the carrier plate of each exposure module of the plurality of exposure modules, the exposure modules being detachably electrically connected to one another by parallel lines, one of the parallel lines being a planar power-supplying line, secured to lateral surfaces of a module carrier web on the module carrier and connected by a screwed connection to another line of the parallel lines, the another line being connected to a respective exposure module.

* * * * *